March 19, 1946.  C. B. RICHEY  2,397,045
LOADER
Filed March 31, 1944  4 Sheets-Sheet 1
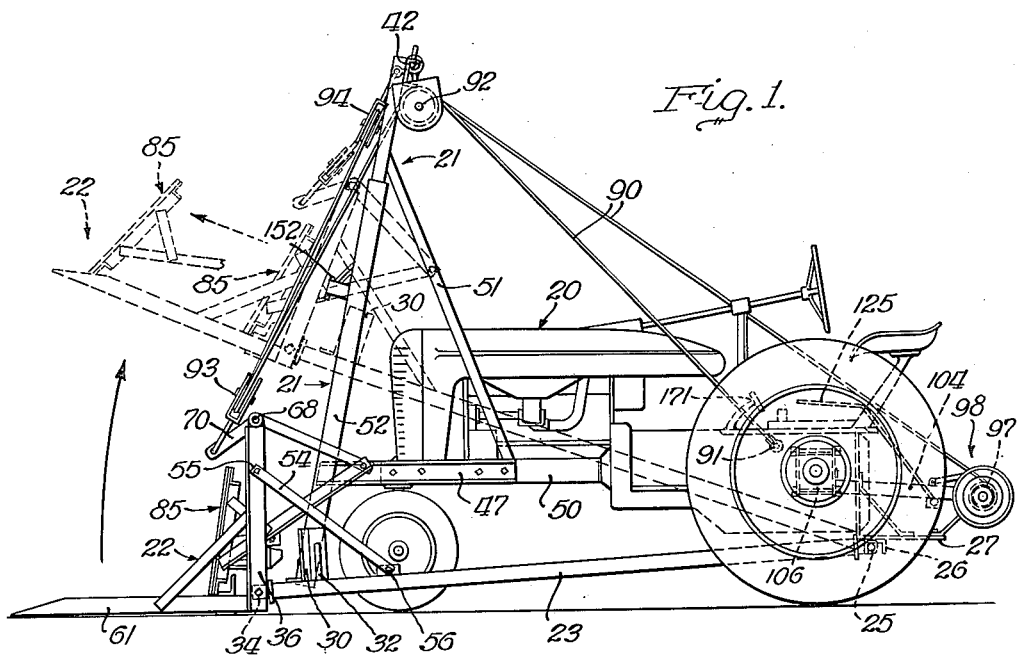
Fig. 1.
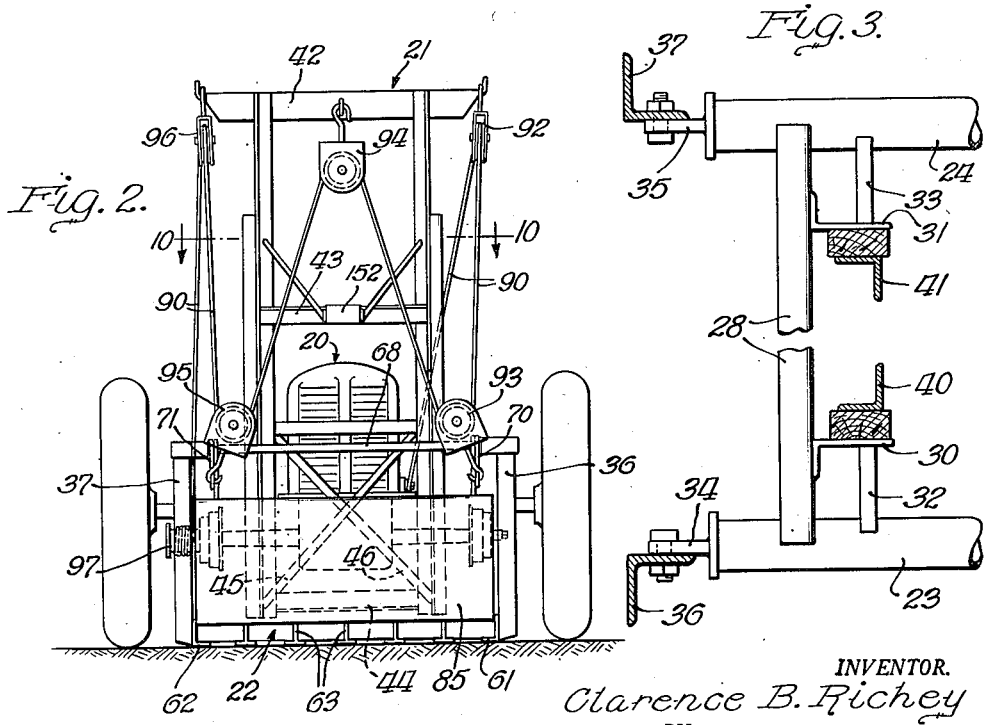
Fig. 2.
Fig. 3.
INVENTOR.
Clarence B. Richey
BY
Charles K Woodin
Agent

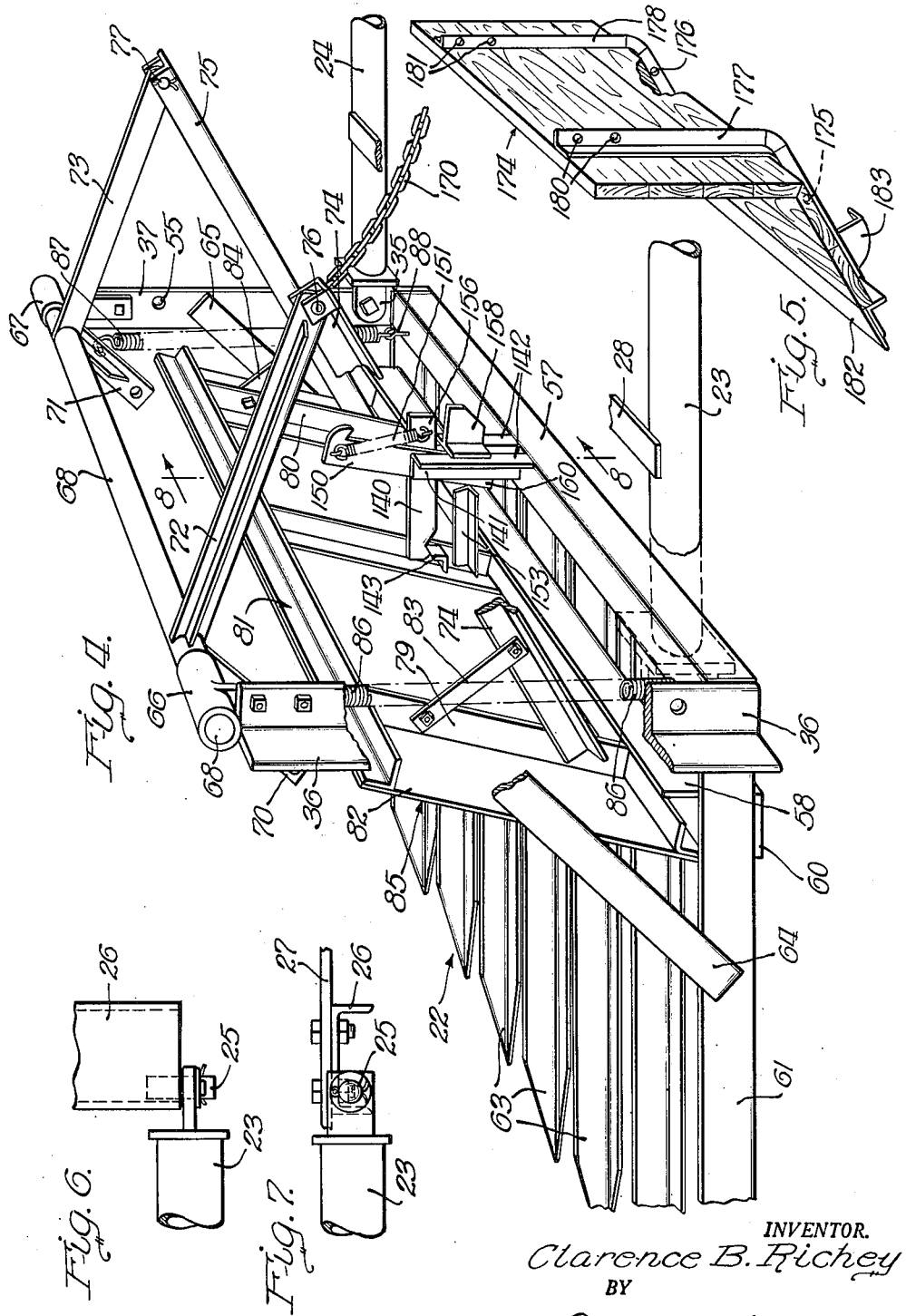

March 19, 1946. C. B. RICHEY 2,397,045
LOADER
Filed March 31, 1944 4 Sheets-Sheet 3
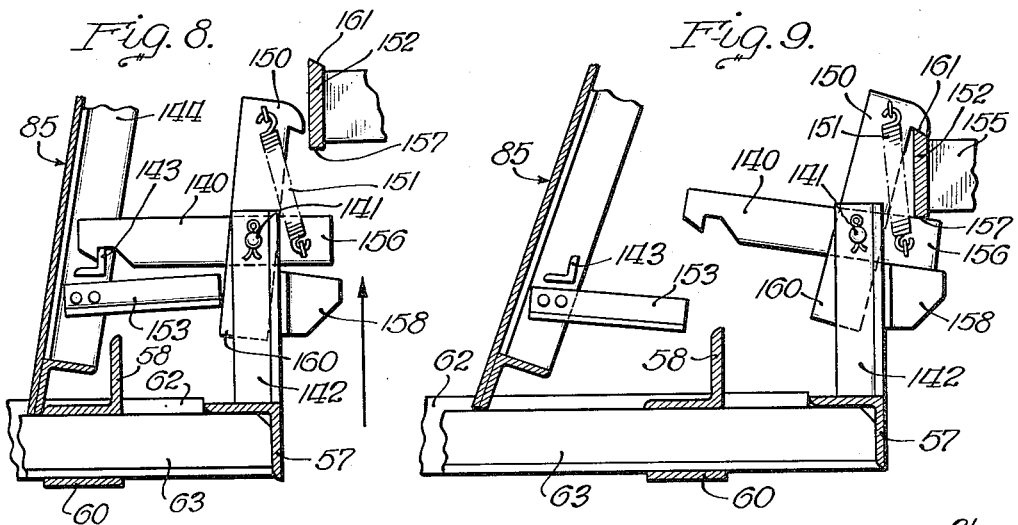
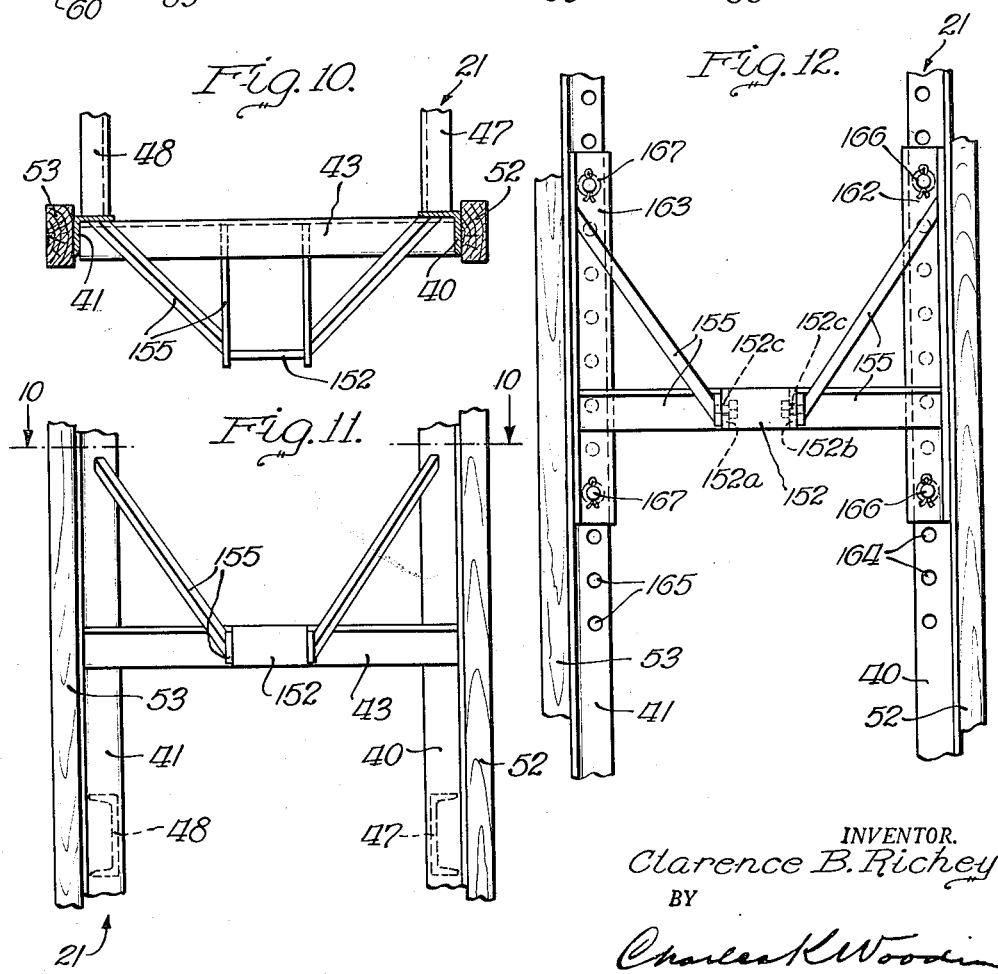
INVENTOR.
Clarence B. Richey
BY
Charles K. Woodin
Agent.

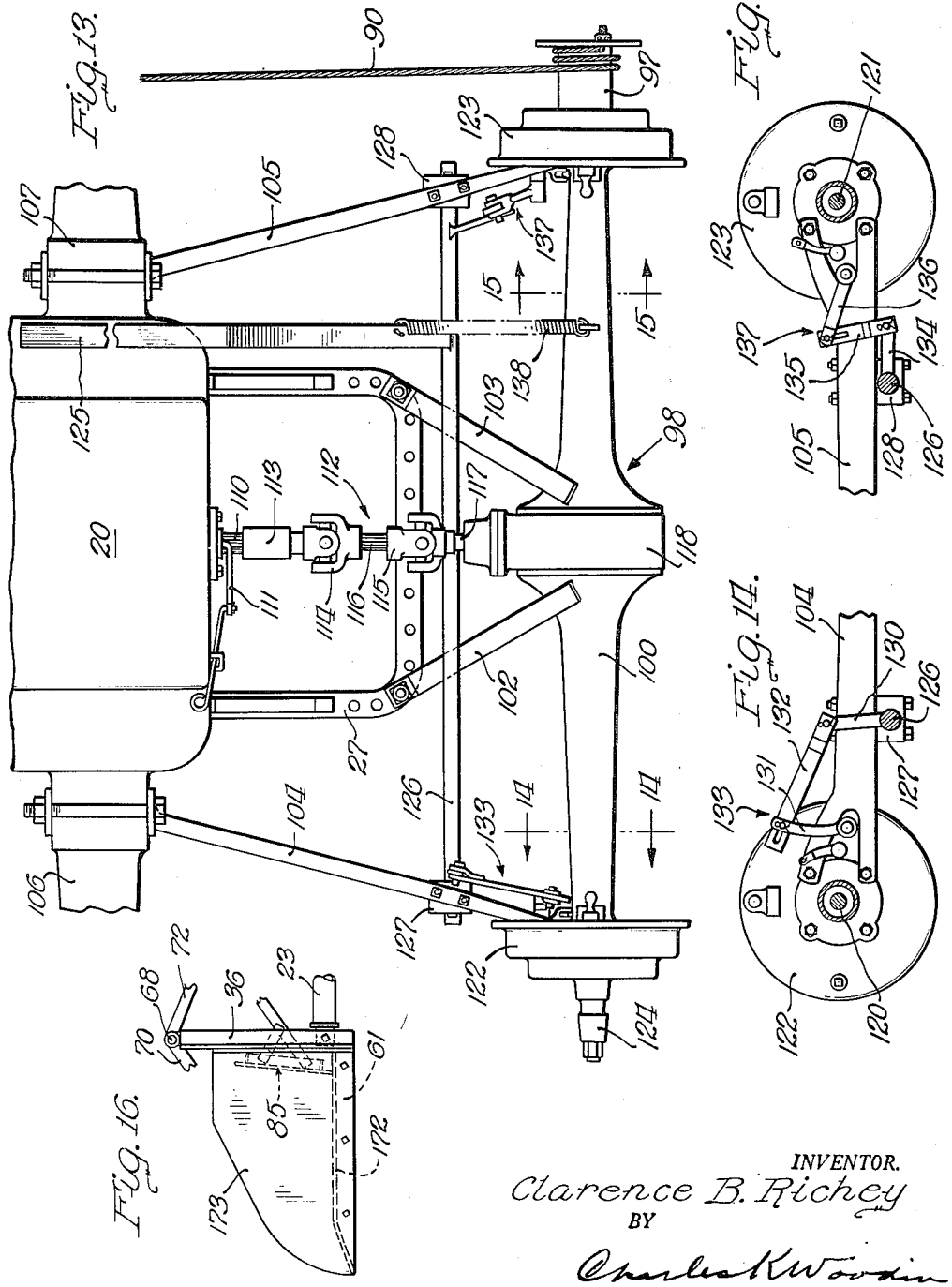

Patented Mar. 19, 1946

2,397,045

UNITED STATES PATENT OFFICE 2,397,045

LOADER

Clarence B. Richey, Quincy, Ill., assignor to Electric Wheel Company, Quincy, Ill., a corporation of Illinois Application March 31, 1944, Serial No. 528,921

14 Claims. (Cl. 214—131)

This invention is directed to a front end tractor loader devised primarily for the purpose of handling farm materials such as manure or the like. The fork portion of the loader is of a type having a plurality of tines or prongs which can be driven into a pile of manure or other similar materials to take on a load of such material and for transferring the same to a manure spreader or to some other point of discharge.

By providing the fork with a suitable plate secured to the tines and with suitable side members also in the form of plates the fork may be readily converted into a scoop or shovel for the purpose of handling dirt, gravel or other materials of finer aggregate. A rear plate or shield is not necessary in the present design of fork inasmuch as this design includes a push-off which forms a backing plate adapted for riding upon the tines of the fork and which can be manipulated at the appropriate time for discharging material from the loading fork as controlled by the operator of the device.

The present construction also permits easy removal of the loading fork and the attachment of a bull-dozer blade in place of the fork for the purpose of using the tractor with the arrangement described for the purpose of bull-dozing and similar work.

To provide a tractor load of the type mentioned, wherein the fork is equipped with a push-off for the purpose of discharging the materials being loaded, is advantageous and desirable for various reasons. Such a fork eliminates the use of framework of objectionable height which is necessary in employing a dump type of fork in place of a fixed fork with a push-off. Obviously, the push-off type of fork, by reason of requiring a lower lifting frame at the front end of the tractor, enables the use of such a loader under sheds or in other places where low clearance prevails.

Another advantage of the push-off type of loading fork is that the mechanism to which the fork is attached and which is connected to the tractor for operably lifting the fork from loading position to discharge position may be of shorter length reducing the cost and weight of such fork supporting means. In a dump type of fork or scoop, the same must be mounted far enough beyond the front tractor wheels to hang over the vehicle when loading to permit dumping of such fork within the vehicle. It is apparent that the dump type of fork requires extra leverage to lift heavy loads in view of the disposition of this fork at a considerable distance ahead of the front wheels of the tractor. This places a severe strain on the front wheels of the tractor and has been the cause of raising the back wheels of the tractor off of the ground causing the tractor to tip over by reason of the closely spaced front wheels. The push-off type of fork delivers the load over the ends of the teeth and this permits the setting of the tractor fork close to the tractor's front wheels, thus reducing the overhanging load on the wheels and eliminating the possibility of lifting the rear wheels off the ground. Furthermore, by having the fork substantially close to the front end of the tractor, the tractor and loading units can be maneuvered in smaller quarters, which is another advantage over the longer type of tractor supported dumping type of loading fork.

Another advantage in having a push-off type of fork is the possibility and the practical manner in being able to rigidly attach the fork to the lifting members which form the push members for the fork making a very rigid assembly. With the dump type of fork, the same must be joined through suitable hinged or pivotal mountings whereby the rigidity between the fork and the fork operating mechanism is considerably less rigid and durable.

Heretofore, in loaders of the push-off type of construction, it has been the practice to use separate and distinct applications of powers for operating the fork from loading to discharge positions, and for the purpose of actuating the push-off mechanism of the fork. For instance, a cable hoist unit, including a clutch and a brake, has been used to lift the loader and another similar arrangement working independently from the first has been used for actuating the push-off. This involves considerable mechanism complicating a loader, and also making the cost of such device prohibitive for ordinary farm operation or similar uses. One of the main advantages of the present invention has been to provide a single power means having only one single cable requiring one hoist with a clutch and a brake and with but one control lever whereby the fork may be raised from loading to discharging positions and whereby the push-off of the fork may also be operated by the same power means through the operation of the control lever when desired by the operator.

Another object or advantage of the present device is the incorporation of means which permits transfer of the weight of the loaded fork from the fork raising arms and hoisting cable to the fork guiding frame supported upon the tractor, after such fork has been raised into the appropriate position prior to effecting the discharge of the material. In this manner, the entire weight of the fork and the material carried thereon is transferred and supported upon the frame of the tractor and so held while the latter is being maneuvered from one position to the other.

By such a mechanism it is possible to relieve all of the lifting mechanism, the hoisting cable and associated parts from the burden of supporting the fork and its load until the material has been discharged from the fork by the push-off. The return of the push-off automatically releases the fork from its latched and supported engagement with the tractor frame to permit such fork to lower into loading position.

All other objects and advantages inherent in the design of the front end loader construction shall hereinafter appear in the following detailed description of a preferred embodiment thereof, such description having reference to the accompanying drawings disclosing a preferred embodiment thereof.

In the drawings:

Fig. 1 is a side elevational view of the front end loader as attached to a tractor;

Fig. 2 is a front elevational view of the loader illustrated in Fig. 1;

Fig. 3 is a fragmentary plan sectional view of the forward end of the fork supporting arms;

Fig. 4 is a perspective view of the loader fork and its push-off with certain portions broken away to illustrate the details of construction of the fork;

Fig. 5 is a perspective view of a bull-dozer blade which may be used to replace the fork in Fig. 4 when the loader is to be used as a bull-dozer;

Figs. 6 and 7 are plan and side elevational views respectively illustrating the manner in which the fork raising arms are pivotally supported from the tractor draw-bar;

Fig. 8 is a fragmentary sectional view of the fork latching mechanism and push-off release means as viewed substantially along the line 8—8 in Fig. 4;

Fig. 9 is a view like Fig. 8 with the parts operated to latch the fork to the frame and to release the push-off;

Fig. 10 is a plan sectional view taken substantially along the lines 10—10 in Figs. 2 and 11 illustrating the portion of the fork guiding frame and the means which cooperates with the latching device illustrated in Figs. 8 and 9;

Fig. 12 is a modified arrangement of the construction illustrated in Figs. 10 and 11 illustrating a manner for adjustably positioning the latching member which cooperates with the mechanism illustrated in Figs. 8 and 9;

Fig. 13 is a plan view of the rear portion of the tractor to illustrate the attachment of the hoist means for the loading fork and the manner in which power is transmitted from the tractor power take-off for the purpose of actuating the fork and its push-off;

Fig. 14 is a fragmentary view taken substantially along the line 14—14 in Fig. 13;

Fig. 15 is another fragmentary sectional view taken substantially along the line 15—15 in Fig. 13; and Fig. 16 is a small view illustrating the conversion of a fork of the type illustrated in Fig. 4 for use as a scoop for handling finer aggregate materials.

Referring to Figs. 1 and 2, a tractor 20 is provided with a detachable framework 21 which is suitably secured rigidly to the tractor. The framework 21 provides the necessary means for guiding fork 22 and for supporting the means for lifting such fork, the latter being rigidly secured to a pair of arms 23 and 24 as best illustrated in Figs. 1 and 3.

The rear ends of each of the fork arms 23 and 24 are each pivotally supported upon pivot pins 25 secured by welding or in any other suitable manner to a channel 26 that is bolted to the tractor draw bar 27 in the manner best illustrated in Figs. 1, 6 and 7. As seen in Fig. 3 the forward ends of the arms 23 and 24 are joined by a cross brace 28 to which are attached the two guide angles 30 and 31 which are each laterally braced by the braces 32 and 33 that connect with the arms 23 and 24 respectively. Arms 23 and 24 are provided with the ears 34 and 35 for rigid attachment to the vertically extending angles 36 and 37 which form part of the framework of the loading fork 22.

Referring now more particularly to Figs. 1, 2, 10 and 11, it is noted that the frame 21 is provided with upright angles 40 and 41 transversely connected and disposed in spaced relation by means of a top channel 42, intermediate brace comprising an angle 43, a bottom brace 44 and suitable intermediate cross braces 45 and 46 illustrated in Fig. 2. Two rearwardly extending channels 47 and 48 as shown in Figs. 1 and 11 provide means for bolting the fork frame to the tractor frame 50 while suitable braces such as 51 in Fig. 1 triangularly stabilize the angles 40 and 41 of the frame 21 with respect to the channels 47 and 48 and obviously this framework 21 becomes a rigid part of the tractor directly maneuverable with the movements of such tractor.

As best seen in Figs. 1, 3, 10 and 11 it is to be noted that wooden guide members 52 and 53 are suitably secured to the upright angles 40 and 41 of the frame 21 to provide rubbing surfaces for the guides 30 and 31 illustrated in Fig. 3. With this arrangement the fork lifting arms are rigidly stabilized and guided in truly vertical fashion with respect to the front end of the tractor and all side sway of the fork together with its associated mechanisms and the load carried thereon is thereby eliminated. Furthermore, arms 23 and 24 which form the push members for the fork are thus well guided and stabilized for the loading operation.

Referring now more particularly to Figs. 1 and 4 it will be seen that in addition to the rigid connection of arms 23 and 24 to the side frame angles 36 and 37 of the fork frame, a pair of braces such as 54 are also suitably secured at 55 to the upper portions of the frame members 36 and 37. At points 56 such braces 54 are secured to the arms 23 and 24 for the purpose of stabilizing the fork rigidly with the movements of the arms 23 and 24. The fork framework in Fig. 4 includes the upright angles 36 and 37 which are cross connected by angles 57 and 58 together with a flat brace 60. Angle 58 together with the flat brace 60 are connected between the side angle tines 61 and 62 of the fork as well as with the intermediate T-shaped tines 63, all of said tines 61, 62 and 63 connecting with the rear cross-angle 57 of the fork frame. Additional braces such as 64 and 65 connect the side tines 61 and 62 and the upright angles 36 and 37 of the fork frame for stabilizing all of the fork tines through their cross-connecting braces 58 and 60 as will be apparent.

A pair of bearings 66 and 67 are bolted to the upper ends of the angles 36 and 37 for carrying a transverse rock shaft 68 in the manner best illustrated in Fig. 4. Shaft 68 is provided with rigidly connected forwardly extending arms 70 and 71 and another pair of rearwardly extending arms 72 and 73 also rigidly secured to the shaft 68 and substantially in alignment with the arms 70 and 71. Another pair of arms 74 and 75 in the form of angles are pivotally connected at 76 and 77 to the arms 72 and 73 while the other ends of such arms 74 and 75 are secured to angles 79 and 80 forming a part of the frame-work 81 to which is suitably attached the push-off plate 82. Additional braces such as 83 and 84 also connect between angles 79 and 80 and the arms 74 and 75 to rigidly secure the push-off assembly with the arms 74 and 75.

The lower edge of the push-off, the latter being generally indicated by the reference numeral 85, rests upon the upper portions of the tines 63 for sliding movement thereupon, and the lateral edges of the push-off 85 are confined between the upstanding legs of the side tines 61 and 62 which project higher than the top edges of the intermediate tines 63 in the manner best illustrated in the Figs. 2, 8 and 9. This provides a means for guiding the push-off to the ends of the tines and insures correct return of this member to its inoperative retracted position.

A pair of coil springs 86 and 87 are connected with suitable eyes such as 88 secured to the crossbar 57 and to the arms 70 and 71 at the other end. These springs act to retract the push-off and to maintain the same in its inoperative retracted position. The action of springs 86 and 87 is transmitted through the arms 70 and 71 to the rock shaft 68 which in turn normally urges arms 72 and 73 upwardly as viewed in Fig. 4, thereby causing a retraction of the arms 74 and 75 which are secured to the push-off 85 as described.

The hoisting mechanism may best be explained by reference to Figs. 1 and 2. A single cable 90 is conveniently secured at a suitable point such as 91 to a portion of the tractor forming a fixed point for the outer end of such cable and extends about a plurality of sheaves 92, 93, 94, 95 and 96 and then winds upon a drum 97 which is operatively driven through a power unit generally indicated at 98. Referring to Fig. 2 it should be noted that the sheaves 92, 94 and 96 are suitably carried upon the cross channel 42 at the upper end of the fork frame while the sheaves 93 and 95 are hooked through suitable openings located in the outer ends of the arms 70 and 71 of the cross shaft 68 of the fork.

Referring now to Figs. 13, 14 and 15, a power transmission means such as 98 is suitably adapted for driving the drum 97 to operate cable 90 and such means may be of any suitable arrangement that will be equivalent to the mechanism herein employed for obtaining the necessary action for operating the fork while in use. With a loader of the present construction, a conventional rear axle of an automobile has been indicated generally as at 100 to provide the necessary power transmission and control to the drum 97. This axle 100 has been mounted upon the rear end of the tractor by means of a pair of braces 102 and 103 connecting the same to the tractor draw bar 27, while additional outboard braces 104 and 105 stabilize the ends of the axle 100 and are suitably secured by a removably connected bolt means to the housings 106 and 107 for the rear axle of the tractor.

Power is supplied to the rear axle unit 100 through the power take-off shaft 110 which is gear connected to the power drive of the tractor by means of the control level 111 in a conventional way. A transmission shaft unit 112 including a socket 113 splined internally for receiving the end of the shaft 110, together with a pair of universals 114 and 115 connected by shaft 116 are all associated and connected for transmitting power in the usual manner to the axle housing drive shaft 117. The drive from the shaft 117 operates through a conventional differential unit 118 which has not been illustrated in detail, but which drives shafts 120 and 121 shown in Figs. 14 and 15 in a manner well known to the art. Shafts 120 and 121 operate through conventional brakes 122 and 123 respectively, while shaft 120 merely ends at a dead end such as 124 and shaft 121 is connected to the drum 97 which forms the cable winding means for cable 90.

The rear axle of the automotive type 100 provides the necessary mechanism to function as a control for operating the lift fork and its connected push-off. This rear axle assembly functions both as a clutch and as a brake and the mechanism connected therewith for the operator to control the same, has a neutral or intermediate position where neither brake or clutch will be active to permit the fork to lower into loading position or into any intermediate desired relation between its two extremes of movement.

The control means consists primarily of a foot operated lever or pedal adjacent and slightly to the rear of the ordinary tractor foot pedals or controls, such lever being indicated by the number 125. Such lever is connected to and adapted to rock a cross shaft 126 which is journalled in bearings 127 and 128 secured to the under sides of the outboard braces 104 and 105 respectively. To the left of Fig. 13 and in Fig. 14 it will be noted that shaft 126 is provided with an arm 130 and the latter is suitably connected to the arm 131 of the brake setting mechanism of the brake 122 by means of a connecting link 132, this link mechanism generally being designated as 133 for the purpose of providing a means for operating brake 122 and controlling the rotation of the shaft 120 which extends from the differential 118.

Referring now to the right hand portion of Fig. 13 and to Fig. 15, shaft 126 has another arm 134 secured thereto for operating the brake mechanism of the brake 123 by actuating the arm 136 through the instrumentality of the connecting link 135.

The operation of this construction illustrated in Figs. 13, 14 and 15 for controlling the movements of the cable drum 97 is extremely simple and can be very efficiently actuated by the movements of the operator with his foot upon the lever or pedal 125. At this point it should be noted that the brake operating linkage 133 in Fig. 14 for actuating brake 122 is oppositely disposed with respect to the operating linkage generally indicated at 137 in Fig. 15 for operating the brake 123. The action resulting from the depression or release of pedal 125 is as follows: The pedal 125 is normally urged upwardly by means of a spring 138 under which conditions shaft 126 rotates in a direction to set the brake 123 for locking drum 97 against rotation. Therefore, when lever 125 is in the position at the top limit of its movement, as caused by the action of spring 138, the brake 123 is set to hold drum 97 and obviously will hold the fork in any position due to the retention of cable 90. This action tends and does release the brake 122 which merely permits the drive from the tractor to idle shaft 120 and its connected gearing and brake drum. By depressing lever 125, the braking action is completely reversed, and under these conditions brake 123 is released while brake 122 holds the mechanism including shaft 120 and its portion of the differential gears in such a position as to act as a clutch permitting a drive from the power take-off shaft 110 through the universal power transmission means 112 and through the operable portion of the differential 118 to rotate shaft 121 through a fixed gear ratio and obviously thereby turning drum 97 secured to shaft 121. This causes the cable 90 to wind upon drum 97 and whereby the cable 90 through the sheaves will act to raise the fork for lifting the load into discharge position. Subsequent explanation will clarify the exact meaning of the discharge position of the fork in relation to the fork frame and tractor.

The foregoing shows the two extremes of operation, namely, the lifting of the fork and the braking or stopping of the same in any intermediate position of the allowable lift thereof. When lever 125 is stopped between the above positions or substantially midway between the braking position and hoisting position as determined by the rear axle mechanism and its control, both of the brakes 122 and 123 will be inoperative to permit free rotation of drum 97 and consequently to allow the cable 90 to unwind from the drum 97 under the weight of the lifting fork, in which case the fork may lower itself through gravity into its initial loading position. Release of lever 125 will obviously set the brake to hold the fork in any intermediate position as described before.

Referring now to Figs. 4, 8 and 9, attention is directed to the fact that the cross-shaft 68 is normally held against rotation by suitable latch means which obviously prevents arms 70 and 71 from rotating so that winding up of the cable 90 will cause the sheaves 93 and 95 to lift the entire fork and its supporting means by reason of the sheaves 93 and 95 being attached to the ends of the arms 70 and 71. The latch mechanism is best illustrated in Figs. 4, 8 and 9 and comprises a latch hook 140 pivotally supported at 141 upon a pair of angles 142 connected and carried by the fork cross angle 57. The forward end of the latch hook 140 engages an angle 143 secured to member 144 forming a portion of the frame of the push-off. Therefore, so long as the latch hook 140 engages the retention means in the form of the holding angle 143, the push-off is locked against movement relative to the fork under which action any rotation of the arms 72 and 73 connected to the cross shaft 68 shall be restrained through the instrumentalities of the arms 74 and 75 rigidly secured to the push-off.

A second latch hook 150 is also pivotally mounted upon the pin 141 and a spring 151 connects the upper end of latch hook 150 and the rearwardly extending portion of the latch hook 140. By reason of spring 151, as viewed in Fig. 8, the latch hook 140 is normally urged in counter-clockwise or latching direction while the latch hook 150 is urged into its normal latching engagement in a clockwise direction for the purpose of hooking onto a stop member or latch plate 152 carried and held by the frame 21.

As shown in Fig. 8, the latch hook 150 is normally held in the position illustrated by means of a push bar or any other similar projection as 153 that is securely connected to the push-off. As best shown in Figs. 10 and 11, the latch plate 152 is supported and carried in a predetermined position by means of the framework 155 so as to maintain the latch plate 152 in a definite relation to the lifting fork mechanism as the latter is being hoisted to its upper and discharging position. As the fork is lifted through the cable wrapping upon the drum 97 the rear end 156 of the latch hook 140 strikes the underside 157 of the latching plate 152 causing the latch hook to revolve about its pivotal pin 141 into the position illustrated in Fig. 9 causing the rear end 156 of the latch hook 140 to abut the top side of a stop 158 secured to the uprights 142. This action immediately releases the push-off 85 as the hook disengages the stop or latch angle 143 whereupon the push-off is moved forwardly inasmuch as the links 70 and 71 can now rotate the shaft 68 to operate the push-off linkage consisting of the arms 72 and 73 and arms 74 and 75 respectively. At the moment that the push-off moves forwardly the projecting lock member 153 immediately releases the lower end 160 of the latch hook 150 permitting the hook to rotate about the pin 141 whereupon the hook 150 immediately engages over the top edge 161 of the latch plate 152. This latter action obviously transfers the entire weight of the loading fork together with the material carried thereon, to the frame 21 of the loader since the latch plate 152 is rigidly connected by means of the framework 155 to the frame 21. At the same time, the push-off operates moving the material toward the end of the fork to discharge the loaded material and under these conditions it is apparent that drum 97 and cable 90 now function solely to rotate shaft 68 through the sheaves and arms 70 and 71 to discharge the load off of the fork by means of the push-off.

After the load has been discharged, the operator releases pedal 125 to its midway position whereupon the hoisting effort is interrupted by the release of cable 90, and spring 86 and 87 now act to reverse the action of links 70 and 71 to rotate the cross shaft 68 in a counter-clockwise direction as viewed in Fig. 4 causing the push-off to return to its normal retarded and inoperative relation upon the fork. At the time when the push-off returns to its normal retracted position, the stop member or projection 153 engages the lower end of the hook 160 whereby the latter is rotated away from the top edge 161 of the latch plate 152 to automatically release the fork from the frame. This causes the cable to again support the fork if brake 123 is applied but if the pedal 125 is in midway or neutral position the fork will now return by gravity to its ground position through its own weight in readiness for picking up another load of material. Obviously, the instant that latch hook 150 is released from the latch plate 152 the next movement will also immediately allow hook 140 to catch behind the cross angle 143 for latching and locking the push-off in its normal retarded and inoperative position. This action is accomplished by movement of the end 156 of the latch hook 140 away from the bottom edge 157 of the latch plate 152 as the fork begins to lower.

It is obvious, from the above description, that the present front end loader provides a very efficient construction which enables the use of one power source including the necessary clutching and braking means all acting upon one cable drum for causing a single cable to lift the fork and to subsequently operate the push-off by means of a single control lever 125 which has been illustrated as foot operated but may also be hand operated if desired.

The upward terminal position which is the discharge position of the fork is obviously determined by the location of the latch plate 152. The fork shall always come to this particular position and by reason of the operation of the latch mechanism described in connection with Figs. 8 and 9 the push-off shall operate at this particular point. It may, however, be desirable to vary this position somewhat or to have a means for being able to do so. In this connection reference may be had to Fig. 12 wherein the framework 155 supporting the latch plate 152 is secured to a pair of angles 162 and 163 that are slideable along the length of the angles 40 and 41 of the upright frame 21. Angles 162 and 163 together with the framework for supporting the latch plate 152 now constitute a movable or adjustable bracket means for positioning the plate 152 in any one of a number of vertical positions as determined by the holes 164 in the angle 40 and holes 165 in the angle 41. Pins such as 166 and 167 respectively may be employed for locking the latch plate frame against relative movement with respect to the frame 21 of the loader. In addition to the above adjustment, plate 152 now has a pair of rearwardly extending legs 152a and 152b each having suitable slot and bolt means 152c to provide fore and aft adjustments of plate 152 to compensate for the arcuate path taken by the fork and its associated latching mechanisms.

Under normal conditions of operation, it is also entirely within the operator's control to interrupt the forward movement of the push plate at any point along the length of the tines which he knows from experience shall be sufficient to discharge the entire load from the end of the fork. It is contemplated as a safety measure to add a chain or cable similarly to that illustrated in Fig. 4 and indicated at 170 which can be connected as shown at the pivotal point 76 of the push-off arms 72 and 74, and which chain or cable 70 may have its other end connected with the tractor clutch pedal illustrated at 171 in Fig. 1 or as another alternative the end of the chain or cable may be secured to the lever 111 in Fig. 13 or to foot control lever 125 to interrupt the drive to the winding drum 97. By using a chain or cable such as 170 it is possible to introduce sufficient slack in such chain or cable to permit the operation of the push-off to the extreme ends of the tines or teeth of the fork, and whereby the drive to the drum and pull on the cable 90 is automatically stopped when this extreme condition occurs or at any time when the operator should forget to disengage the hoist.

Fig. 16 illustrates the use of the loading fork as a scoop for working with materials such as sand, dirt or gravel. In this form the same fork is utilized as described, but a plate such as 172 is bolted or otherwise conveniently secured to the tines to form a solid bottom while side plates such as 173 may be screwed or bolted to the sides of the tines 61 and 62 and to the uprights 36 and 37 in any desirable manner.

The bull-dozer blade 174 illustrated in Fig. 5 may be used as an alternative means in place of the fork illustrated in Fig. 4, permitting the conversion of the loading fork into a bull-dozing arrangement. By unbolting the front ends of the arms 23 and 24 from the loading fork and by disconnecting the braces 54 such as illustrated in Fig. 1 from the upper end of the loading fork, the bull-dozer blade 174 may be bolted thereto by securing the ears 34 and 35 of the arms 23 and 24 at the openings 175 and 176 in the bull-dozer angles 177 and 178. In addition, the braces 54 can be bolted at either one of the openings 180 and 181 respectively, depending upon the tilt which is wanted in securing the bull-dozer blade 174 to the forward ends of the fork lifting members. The forward edge of the bull-dozer blade 174 is provided with metal angle construction 182 for the purpose of protecting this portion of the blade and for providing a good scraping edge, while a pair of skids such as 183 are secured to the angles 177 and 178 to allow the bull-dozer blade to ride along the surface of the ground or cement as the case may be.

It is obvious that the foregoing description and disclosure are directed to a preferred construction of the present loading device and that various changes and modifications are contemplated which will produce equivalent mechanisms or mechanical structures that shall function and produce their operative requirements in a like manner as will the mechanisms described. It is therefore believed that the present construction is not to be limited to the exact form, construction or combination of parts described and illustrated excepting insofar as shall be determined by the breadth and scope of the appended claims.

I claim:

1. A mobile loader having, in combination, a frame unit, a material loading unit, a material push-off for said latter unit, actuating mechanism carried by said loading unit for moving said push-off, locking means to lock said push-off actuating mechanism, and power means including a hoisting cable for raising said loading unit, said loading and frame units having cooperative means for stopping and holding said loading unit upon said frame at a predetermined position, and said frame unit having trip means to release said locking means to permit said cable to operate said push-off actuating mechanism to move said push-off upon active engagement of the cooperative means to hold said loading unit upon the frame unit.

2. A loader for a tractor comprising a frame attached to said tractor, a loading fork movably mounted upon said tractor, a push-off for discharging material from said loading fork, actuating mechanism carried by said fork for operating said push-off, latch means to prevent operation of said actuating mechanism, power hoisting means connected with said actuating mechanism to move said fork relative to said frame, and cooperative locking means carried by said fork and frame respectively to lock said fork to said frame at a predetermined position thereupon, said frame having trip means thereon to release said latch means whereby said power hoisting means operates said actuating mechanism to move the push-off while said fork is locked to the frame.

3. A loader for tractors having a lifting fork and a push-off therefor, said fork being movably supported upon said tractor and having a shaft, actuating means connected between said shaft and said push-off to move the latter upon rocking of said shaft, latch means to hold said push-off against movement and to prevent rocking of said shaft, arms carried by said shaft for connection with power lift means, and cooperative locking means connected with said fork and said tractor respectively to releasably secure the fork to the tractor at a predetermined lifted position, and trip means on said tractor for releasing said latch means to permit said power lift means to rock said shaft for moving said push-off while the fork is secured in said lifted position.

4. A loader for tractors having a lifting fork and a push-off therefor, said fork being movably supported upon said tractor and having actuating mechanism connected with said fork to move said push-off in one direction for discharging loaded material, power means including a cable connected with said actuating mechanism, latch means to prevent operation of said actuating mechanism to permit said cable to lift the fork through the instrumentality of said actuating mechanism while the latter is latched, and cooperative means on said fork and said tractor to lock the fork in raised position, said tractor having trip means to release said latch means while the fork comes to the aforesaid raised position whereby said cable operates the push-off actuating mechanism.

5. A loader for tractors having a lifting fork and a push-off therefor, said fork being movably supported upon said tractor and having a shaft, actuating means connected between said shaft and said push-off to move the latter upon rocking of said shaft, latch means to hold said push-off against movement and to prevent rocking of said shaft, arms carried by said shaft for connection with power lift means, and cooperative locking means connected with said fork and said tractor respectively to releasably secure the fork to the tractor at a predetermined lifted position, trip means connected with said tractor to release the latch means to rock said shaft in one direction to urge said push-off along said fork to discharge loaded material while said fork is secured in said lifted position, and resilient means connected between said fork and said actuating means to retract said push-off upon release of said power lift means.

6. A loader for tractors having a lifting fork and a push-off therefor, said fork being movably supported upon said tractor and having actuating mechanism connected with said fork to move said push-off in one direction for discharging loaded material, power means including a cable connected with said actuating mechanism, latch means to prevent operation of said actuating mechanism to permit said cable to lift the fork through the instrumentality of said actuating mechanism while the latter is latched, cooperative means on said fork and said tractor to lock the fork in raised position, said tractor having trip means to release said latch means while the fork comes to the aforesaid raised position whereby said cable operates the push-off actuating mechanism, and resilient means connected between said fork and said actuating mechanism to retract said push-off in the opposite direction upon release of the cable from said power means.

7. A loader for tractors having a lifting fork and a push-off therefor, said fork being movably supported upon said tractor and having a shaft, actuating means connected between said shaft and said push-off to move the latter upon rocking of said shaft, latch means to hold said push-off against movement and to prevent rocking of said shaft, arms carried by said shaft for connection with power lift means, and cooperative locking means connected with said fork and said tractor respectively to releasably secure the fork to the tractor at a predetermined lifted position, trip means connected with said tractor to release the latch means to rock said shaft in one direction to urge said push-off along said fork to discharge loaded material while said fork is secured in said lifted position, and resilient means connected between said fork and said actuating means to retract said push-off upon release of said power lift means, said push-off having abutment means thereon to cause said cooperative locking means to release said fork from said tractor, movement of said fork relative to said trip means upon release of the former from the tractor causing re-engagement of said latch means to again hold said push-off against movement in its retracted position upon said lifting fork.

8. A loader for tractors having a lifting fork and a push-off thereof, said fork being movably supported upon said tractor and having actuating mechanism connected with said fork to move said push-off in one direction for discharging loaded material, power means including a cable connected with said actuating mechanism, latch means to prevent operation of said actuating mechanism to permit said cable to lift the fork through the instrumentality of said actuating mechanism while the latter is latched, cooperative means on said fork and said tractor to lock the fork in raised position, said tractor having trip means to release said latch means while the fork comes to the aforesaid raised position whereby said cable operates the push-off actuating mechanism, and resilient means connected between said fork and said actuating mechanism to retract said push-off in the opposite direction upon release of the cable from said power means, said push-off having a part thereof adapted for engagement with said cooperative means to release the fork from its raised position, movement of said fork relative to said trip means when said fork is released from its raised position causing re-engagement of said latch means with said actuating mechanism to again hold the latter against movement and to keep said push-off in its retracted position upon said lifting fork.

9. A loader for a tractor having, in combination, a loading fork movably mounted on said tractor, power means connected with the power take-off of said tractor and adapted to raise the fork, said loading fork having a push-off to discharge loaded material therefrom, operable mechanism carried by said fork to actuate said push-off including connecting means for attachment with said power means, locking means to prevent operation of said push-off while said fork is being raised, a latching means to releasably secure the fork in raised position upon said tractor including means to release said locking means whereby said operable mechanism actuates said push-off under action of said power means.

10. A loader for a tractor having, in combination, a loading fork, a material push-off on said fork, power means including a single drum and a single cable adapted to raise said fork, actuating mechanism carried by said fork to move the push-off in a direction to discharge material from said fork, said actuating mechanism having an attachment part for connection with said cable to cause operation of said push-off, locking means on said fork to prevent said actuating mechanism from working while said fork is being raised by said cable, cooperative means carried by said fork and tractor to interrupt the upward travel of said fork and to releasably secure the latter to the tractor thereby transferring the weight of the fork and its material contents from the cable to the tractor, said cooperative means including a trip to release said locking means whereby said cable operates the actuating mechanism to move the push-off along said fork to discharge material, and cooperative means for retracting said push-off in the reverse direction upon release of said cable to return the push-off to normal inoperative position and to release said fork from the tractor and to restore said locking means into locked position to again prevent operation of said actuating mechanism.

11. A loader for a tractor having, in combination, a loading fork, a material push-off on said fork, power means connected to be driven from said tractor comprising clutch means, brake means, and a drum driven through said clutch means and having a cable adapted for raising said fork, actuating mechanism carried by said fork to move the push-off in a direction to discharge material from said fork, said actuating mechanism having an attachment part for connection with said cable to cause operation of said push-off, locking means on said fork to prevent said actuating mechanism from working while said fork is being raised by said cable, cooperative means carried by said fork and tractor to interrupt the upward travel of said fork and to releasably secure the latter to the tractor thereby transferring the weight of the fork and its material contents from the cable to the tractor, said cooperative means including a trip to release said locking means whereby said cable operates the actuating mechanism to move the push-off along said fork to discharge material, and cooperative means for retracting said push-off in the reverse direction upon operation of said clutch to release the pull on said cable and to release said fork from the tractor and to again render said locking means operative to prevent operation of said push-off actuating mechanism, said brake means being effective to stop the loading fork at any point of movement or to stop the outward travel of said push-off.

12. A loader for a tractor having, in combination; a loading fork, a material push-off on said fork, single power means connected with the power take-off of said tractor comprising a clutch, a brake, a drum having a cable for raising said fork, and control means including a single foot pedal to operate the clutch upon depression thereof or to set the brake upon its release, with the intermediate pedal position releasing both clutch and brake to permit said drum to unwind said cable, actuating mechanism carried by said fork to move the push-off in a direction to discharge material from said fork, said actuating mechanism having an attachment part for connection with said cable to cause operation of said push-off, locking means on said fork to prevent said actuating mechanism from working while said fork is being raised by said cable, cooperative means carried by said fork and tractor to interrupt the upward travel of said fork and to releasably secure the latter to the tractor thereby transferring the weight of the fork and its material contents from the cable to the tractor, said cooperative means including a trip to release said locking means whereby said cable operates the actuating mechanism to move the push-off along said fork to discharge material, and cooperative means for retracting said push-off upon release of cable pull when said lever is raised to intermediate position, said cooperative means acting to release said fork from the tractor and to again render the locking means operative to prevent operation of said push-off actuating mechanism, the release of said lever causing said brake to operate to stop movement of the fork at any point or to interrupt outward travel of said push-off at any point along said loading fork.

13. In a loader, a frame, a loading fork supported for movement relative to said frame, a push-off on said fork, a first latch mechanism to lock said push-off to said fork, operative means carried by said fork to actuate said push-off, power lift means connected with said operative means to operate the push-off, said first latch mechanism functioning to cause said power lift means to raise said fork while said push-off is locked thereto, and a second latch mechanism including a fork stop having cooperative members on said fork and frame respectively to limit the upward movement of said fork and to lock the latter to said frame, said fork stop providing means to release the first latch mechanism to cause said power lift means to actuate the push-off.

14. In a loader, a frame, a loading fork supported for movement relative to said frame, a push-off on said fork, a first latch mechanism to lock said push-off to said fork, operative means carried by said fork to actuate said push-off, power lift means connected with said operative means to operate the push-off, said first latch mechanism functioning to cause said power lift means to raise said fork while said push-off is locked thereto, and a second latch mechanism including a fork stop having cooperative members on said fork and frame respectively to limit the upward movement of said fork and to lock the latter to said frame, said fork stop providing means to release the first latch mechanism to cause said power lift means to actuate the push-off, and independently operable means connected between said fork and said operative push-off actuating means to retract said push-off when said power lift means is released, said retracting means functioning to relatch said first latch means and to unlatch said fork from the frame.

CLARENCE B. RICHEY.